United States Patent
Princip et al.

(10) Patent No.: US 12,479,579 B2
(45) Date of Patent: Nov. 25, 2025

(54) PASSENGER SEAT WITH SELF-STOWING PORTABLE ELECTRONIC DEVICE HOLDER

(71) Applicant: B/E Aerospace, Inc., Winston-Salem, NC (US)

(72) Inventors: Michael M. Princip, Winston-Salem, NC (US); Jeremy F. Malecha, Pfafftown, NC (US); Travis J. Vaninetti, Bothell, WA (US)

(73) Assignee: B/E Aerospace, Inc., Winston-Salem, NC (US)

( * ) Notice: Subject to any disclaimer, the term of this patent is extended or adjusted under 35 U.S.C. 154(b) by 330 days.

(21) Appl. No.: 18/128,813

(22) Filed: Mar. 30, 2023

(65) Prior Publication Data

US 2024/0327000 A1    Oct. 3, 2024

(51) Int. Cl.
*B64D 11/00* (2006.01)
*B64D 11/06* (2006.01)

(52) U.S. Cl.
CPC .... *B64D 11/00152* (2014.12); *B64D 11/0605* (2014.12)

(58) Field of Classification Search
CPC .......... B64D 11/00152; B64D 11/0605; B60N 3/004
USPC ..................................... 297/188.04
See application file for complete search history.

(56) References Cited

U.S. PATENT DOCUMENTS

| | | | |
|---|---|---|---|
| 4,726,621 A * | 2/1988 | Muller | B61D 33/00 297/146 |
| 6,494,533 B1 * | 12/2002 | Bohler | B60N 3/004 297/188.05 |
| 7,500,716 B2 * | 3/2009 | Guerin | B64D 11/00153 725/77 |
| 8,905,470 B2 * | 12/2014 | Shih | B60N 3/004 297/146 |
| 8,934,063 B2 * | 1/2015 | Boyer, Jr. | H04N 5/655 725/77 |

(Continued)

FOREIGN PATENT DOCUMENTS

| | | | | |
|---|---|---|---|---|
| EP | 3666650 A1 | 6/2020 | | |
| JP | 2010111345 A * | 5/2010 | | B60N 3/004 |

(Continued)

OTHER PUBLICATIONS

European Search Report received in EP Application No. 24166475, Aug. 7, 2024, 9 pages.

*Primary Examiner* — Jose V Chen
(74) *Attorney, Agent, or Firm* — Suiter Swantz IP

(57) ABSTRACT

A portable electronic device (PED) holder for a passenger seat back. The PED holder includes a backstop pivotally attachable to the seat back and a shelf pivotally attached to the backstop. In use, the backstop is configured to rotate to a position outside of a recess formed in the seat back and the shelf is configured to rotate open. When the PED holder is fully deployed, the shelf is substantially horizontal and an angle formed between the backstop and a vertical axis is no greater than about negative 45 degrees, such that when a tray table is stowed the closing motion of the tray table causes the shelf to fold against the backstop and the folded PED holder to rotate into the recess. The present disclosure further provides a passenger seat including the PED holder and a PED holder assembly installable as a kit of parts.

20 Claims, 6 Drawing Sheets

(56) References Cited

U.S. PATENT DOCUMENTS

| | | | |
|---|---|---|---|
| 10,703,482 B1 | 7/2020 | Puglisi et al. | |
| 2006/0075934 A1* | 4/2006 | Ram | B64D 11/0015 |
| | | | 108/44 |
| 2006/0214479 A1* | 9/2006 | Dwire | B60N 3/004 |
| | | | 297/163 |
| 2007/0283855 A1* | 12/2007 | Pozzi | A47B 23/043 |
| | | | 108/44 |
| 2011/0216483 A1* | 9/2011 | Vesely | G06F 1/1624 |
| | | | 361/679.01 |
| 2015/0108798 A1* | 4/2015 | Boyer, Jr. | B60R 11/0252 |
| | | | 297/188.05 |
| 2015/0175265 A1* | 6/2015 | Thiele | B64D 11/06 |
| | | | 297/188.04 |
| 2016/0039525 A1* | 2/2016 | Pajic | G06F 1/1632 |
| | | | 108/44 |
| 2016/0143435 A1* | 5/2016 | Kim | B60N 3/004 |
| | | | 248/447.1 |
| 2016/0152169 A1* | 6/2016 | Zheng | B60R 7/005 |
| | | | 297/163 |
| 2016/0257404 A1* | 9/2016 | Ferris | F16M 13/022 |
| 2016/0280376 A1* | 9/2016 | Pozzi | B64D 11/00152 |
| 2016/0355263 A1 | 12/2016 | Pozzi et al. | |
| 2018/0072424 A1* | 3/2018 | Irons | B60R 11/0252 |
| 2018/0118343 A1* | 5/2018 | Castaing | B64D 11/00152 |
| 2021/0316867 A1* | 10/2021 | Ruiz Lara | B64D 11/00152 |
| 2021/0347486 A1* | 11/2021 | Arroum | B60N 3/004 |
| 2022/0371526 A1* | 11/2022 | Ornelas | B60R 11/02 |
| 2022/0396215 A1 | 12/2022 | Morales et al. | |
| 2023/0001835 A1* | 1/2023 | Madrigal | B60N 3/004 |
| 2023/0322388 A1* | 10/2023 | Lalli | B64D 11/0636 |
| | | | 297/188.04 |
| 2024/0308663 A1* | 9/2024 | Ruiz Lara | B64D 11/00155 |

FOREIGN PATENT DOCUMENTS

| | | |
|---|---|---|
| WO | 2018057117 A1 | 3/2018 |
| WO | 2021141577 A1 | 7/2021 |

* cited by examiner

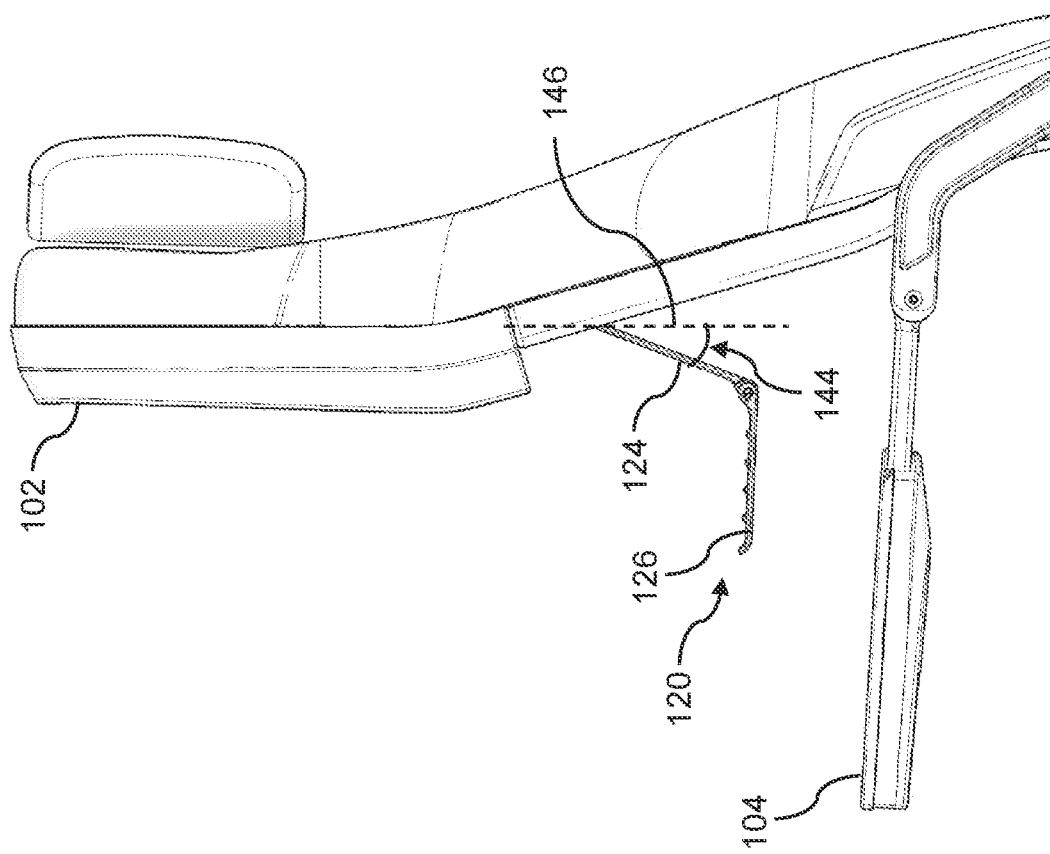

PASSENGER SEAT WITH SELF-STOWING PORTABLE ELECTRONIC DEVICE HOLDER

TECHNICAL FIELD AND BACKGROUND

The present disclosure relates generally to passenger seat amenities, and more particularly, to a portable electronic device (PED) holder configured to deploy from a position behind a stowed tray table, wherein, in use, moving the tray table to a stowed position causes the PED holder to self-stow in a recess formed in the seat back.

Portable electronic devices (PEDs) such as tablets and smartphones are commonly used on aircraft. In economy seating classes including seat back tray tables, PED holders may be integrated into the seat back or built into the tray table. Current tray able solutions consume tabletop space, whereas current seat back solutions do not maintain a desirable viewing angle throughout the range of motion of the seat back. In addition, neither current solution type coordinates PED holder stowing with the stowing motion of the tray table.

Therefore, it would be desirable to provide a PED holder solution for a passenger seat that is intuitive to operate, accommodates seat back recline, and does not interfere with use of the tray table.

BRIEF SUMMARY

In a first aspect, the present disclosure provides a passenger seat including a seat back, a shroud positioned on a back of the seat back, a recess formed in the shroud, and a tray table configured to stow against the shroud, deploy away from the shroud, and cover the recess when the tray table is fully stowed. The passenger seat further includes a portable electronic device holder (PED) including a backstop pivotally attached along a top edge thereof to the seat back and configured to rotate between a stowed position in the recess and a deployed position outside of the recess, and a shelf pivotally attached along one edge thereof to a bottom edge of the backstop. When the backstop is fully deployed, an angle formed between the backstop and a vertical axis is no greater than about negative 45 degrees. When the shelf is fully deployed, the shelf is oriented substantially horizontal. When the tray table, the backstop, and the shelf are each fully deployed, stowing the tray table causes the shelf to rotate against the backstop and the backstop to rotate into the recess.

In some embodiments, the backstop is pivotally attached to the seat back by at least one friction hinge, and the shelf is pivotally attached to the backstop by at least one friction hinge.

In some embodiments, a portion of the at least one friction hinge pivotally attaching the backstop to the seat back is integrally formed with the backstop, a portion of the at least one friction hinge pivotally attaching the shelf to the backstop is integrally formed with the shelf, and a portion of the at least one friction hinge pivotally attaching the shelf to the backstop is integrally formed with the backstop.

In some embodiments, the at least one friction hinge pivotally attaching the backstop to the seat back defines an upper pivot point located within the recess or above the recess and concealed from view behind a portion of the shroud.

In some embodiments, when the tray table and the PED are fully deployed, the shelf is spaced apart above the tray table.

In some embodiments, the shelf includes a raised lip formed along a free edge of the shelf, a handle formed along a middle portion of the raised lip, and a plurality of transverse ridges formed along a top surface of the shelf.

In some embodiments, the PED holder is not available for use when the tray table is fully stowed.

In some embodiments, the passenger seat further includes a tray table latch positioned above the recess and a video monitor positioned above the tray table latch.

In some embodiments, a length of the backstop substantially corresponds to a height of the recess, and a length of the shelf is less than a length of the backstop.

In another aspect, the present disclosure provides a PED holder configured to be installed in a recess formed in seat back of a passenger seat, the recess located behind a stowed tray table associated with the seat back. The PED holder includes a backstop configured to be pivotally attached along a top edge thereof to the seat back, the backstop configured to rotate between a stowed position in the recess and a deployed position outside of the recess, and a shelf pivotally attached along one edge thereof to a bottom edge of the backstop. When the backstop is fully deployed, an angle formed between the backstop and a vertical axis is no greater than about negative 45 degrees. When the shelf is fully deployed, the shelf is oriented substantially horizontal. When the tray table, the backstop, and the shelf are each fully deployed, stowing movement of the tray table is configured to cause the shelf to rotate against the backstop and the backstop to rotate into the recess.

In a further aspect, the present disclosure provides an assembly configured to be installed on a back of a passenger seat, the passenger seat including a tray table configured to cover the assembly when the tray table is in a stowed condition. The assembly includes a shroud configured to be affixed to the passenger seat, the shroud defining a recess. The assembly further includes a portable electronic device holder (PED) including a backstop pivotally attached along a top edge thereof to the shroud, for example through a bracket, the backstop configured to rotate between a stowed position in the recess and a deployed position outside of the recess, and a shelf pivotally attached along one edge thereof to a bottom edge of the backstop. When the backstop is fully deployed, an angle formed between the backstop and a vertical axis is no greater than about negative 45 degrees. When the shelf is fully deployed, the shelf is oriented substantially horizontal. When the tray table, the backstop, and the shelf are each fully deployed, stowing the tray table is configured to cause the shelf to rotate against the backstop and the backstop to rotate into the recess.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the disclosure are disclosed in the following detailed description and the accompanying drawings. The drawings are not necessarily to scale. In general, operations of disclosed processes may be performed in an arbitrary order, unless otherwise provided in the claims. In the drawings:

FIG. 6 is a side view of the passenger seat of FIG. 1, showing the tray table deployed, the PED holder deployed, and the respective angles of the backstop and the shelf when deployed.

DETAILED DESCRIPTION

Figure 1:
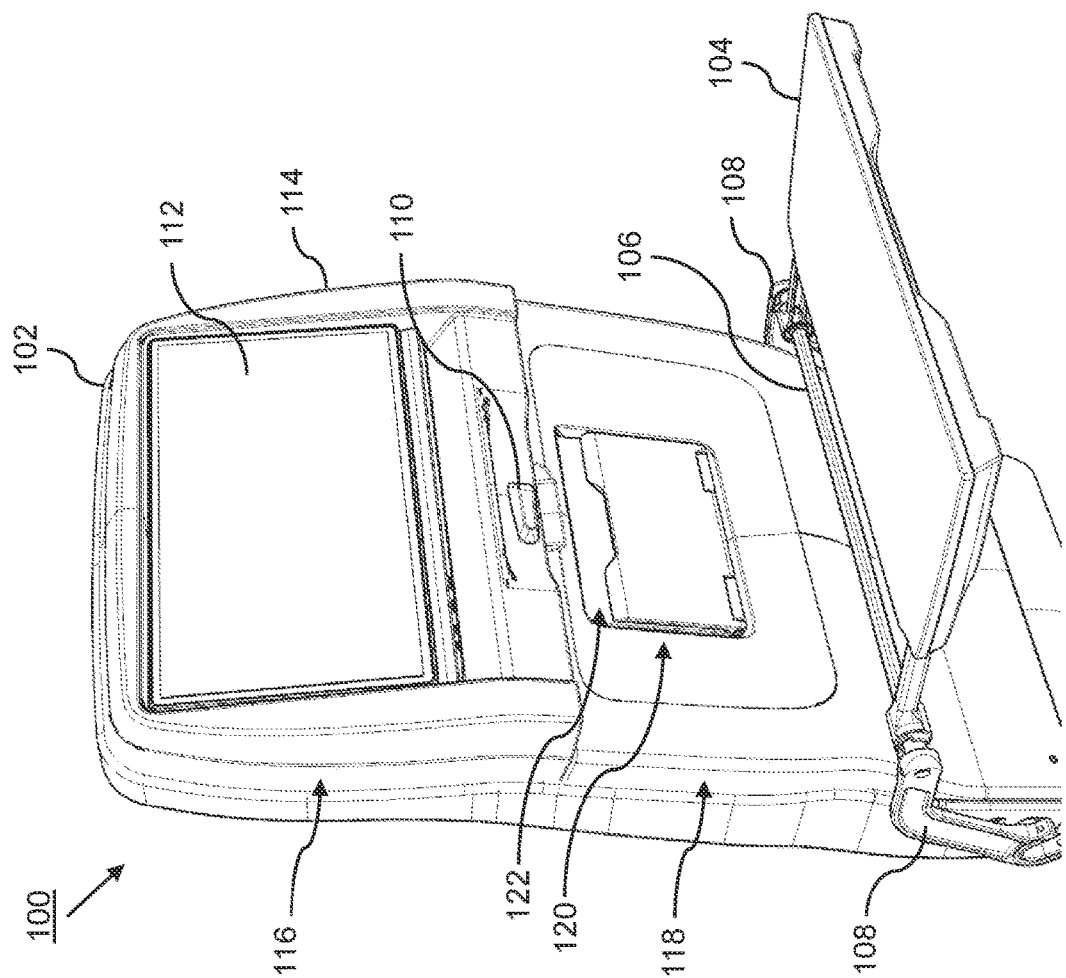
FIG. 1 is an isometric view of a passenger seat including a PED holder according to an embodiment of the present disclosure, showing the PED holder in a stowed condition.

Before explaining embodiments of the inventive concepts disclosed herein in detail, it is to be understood that the inventive concepts disclosed herein are not limited in their application to the details of construction and the arrangement of the components or steps or methodologies set forth in the following description or illustrated in the drawings. In the following detailed description of embodiments of the present disclosure, numerous specific details are set forth in order to provide a more thorough understanding of the inventive concepts. However, it will be apparent to one of ordinary skill in the art having the benefit of the present disclosure that the inventive concepts disclosed herein may be practiced without these specific details. In other instances, well-known features may not be described in detail to avoid unnecessarily complicating the present disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein, where applicable, a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present). In addition, use of the "a" or "an" are employed to describe elements and components of embodiments of the present inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the present disclosure.

Broadly, the present disclosure provides provisions for accommodating personal electronic devices in an aircraft. In a particular implementation, the present disclosure provides a passenger seat equipped with a tray table configured to stow against a seat back, and a PED holder positioned in the seat back behind the tray table when in the tray table is stowed. In use, the tray table is deployed to reveal the PED holder, and the PED holder is separately deployed as needed. In use, the stowing motion of the tray table causes the tray table to engage the fully deployed PED holder, thereby causing the PED holder to rotate into a closed or folded position with a recess formed in the seat back. Friction hinges maintain a positional relationship of the PED holder relative to the seat back and between components of the PED holder itself. In a further aspect, a PED holder assembly is configured to be installed on a seat back.

FIG. 1 illustrates a passenger seat 100 according to an embodiment of the present disclosure. The passenger seat 100 includes a seat back 102 that may be configured to rotate between an upright position for taxi, takeoff, and landing (TTOL) and a reclined position during flight. A tray table 104 affixed to or associated with the passenger seat 100 is configured to rotate between a stowed position against the back of the seat back 102 and a deployed position apart from the seat back 102 in which the tray table 104 is oriented substantially horizontal. The tray table 104 may include mechanisms for one or more of tabletop expansion, and forward, aft, and lateral adjustment. In a non-limiting example, the tray table 104 is supported by a frame 106 affixed to a pair of support arms 108. The support arms 108 may be affixed to the seat frame such that seat back recline does not affect the tray table position.

The passenger seat 100 further includes a latch 110 configured to engage the tray table 104 to maintain the stowed position of the tray table, and a video monitor 112 positioned above the latch 110. The back of the passenger seat 100 may be substantially covered by a shroud 114 provided in one or more sections. For example, a first section 116 may correspond to the upper portion of the seat back 102 and accommodate the latch 110 and the video monitor 112, while a second section 118 may correspond to the middle portion of the seat back 102 and accommodate the PED holder as discussed below. The shroud 114 may include additional sections, for instance a lower section forming a literature pocket.

In a middle portion of the seat back 102, the shroud second section 118 accommodates the PED holder 120. The tray table 104 is dimensioned and positioned such that, when the tray table 104 is fully stowed flush against the seat back 102, the tray table 104 covers the PED holder 120. As such, the PED holder 120 is not available for use when the tray table 104 is stowed during TTOL and otherwise. When the tray table 104 is rotated to the deployed position as shown in FIG. 1, the PED holder 120 is visible to the passenger and available for use. Deploying the tray table 104 does not cause the PED holder 120 to deploy.

The shroud second section 118 forms a recess 122 dimensioned to accommodate the PED holder 120 in a stowed condition. The recess 122 includes a top, a bottom, lateral sides, and a back. The front of the recess 122 is open to receive the PED holder 120. When fully stowed, the PED holder 120 may be positioned flush with the surrounding portions of the shroud second section 118.

Figure 2:
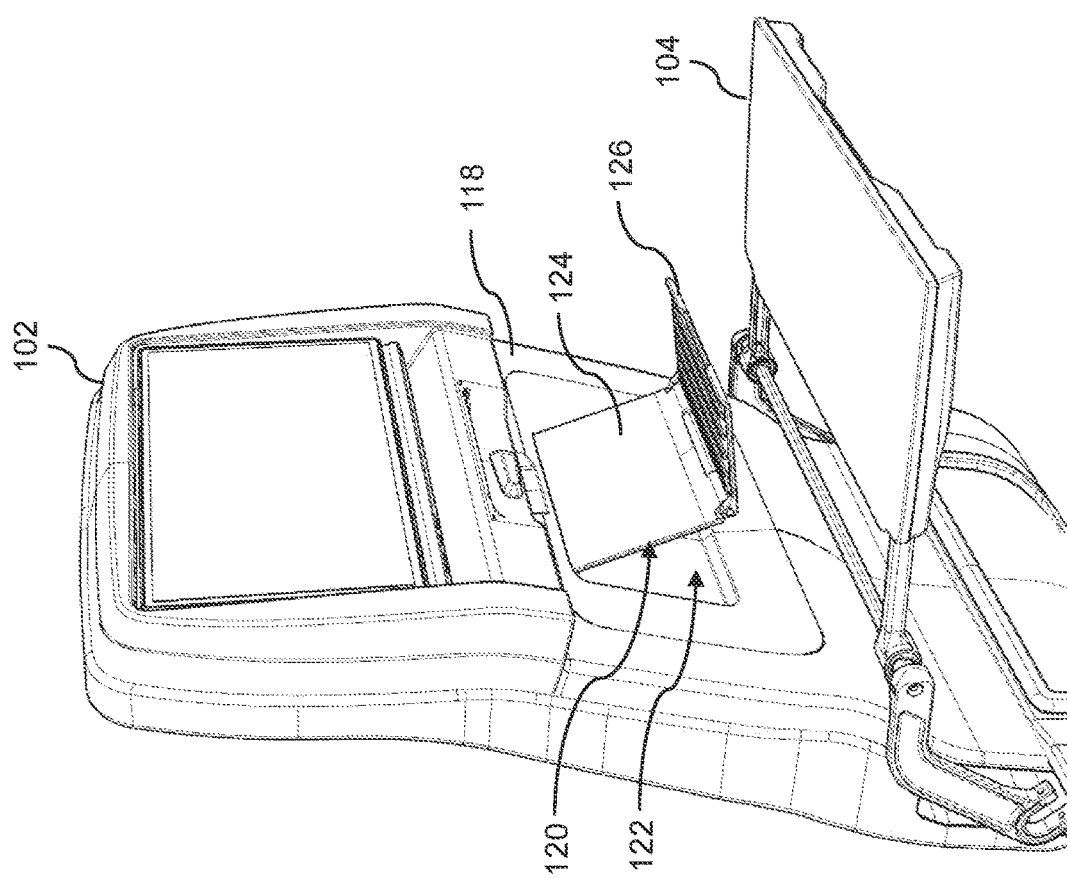
FIG. 2 is an isometric view of the passenger seat of FIG. 1, showing the PED holder in a deployed condition.

FIG. 2 illustrates the PED holder 120 in a deployed condition, for instance a fully deployed condition. The PED holder 120 generally includes a backstop 124 pivotally attached along a top edge thereof to the seat back 102. In some embodiments, the PED holder 120 may attached to the shroud second section 118, such as by a bracket. The PED holder 120 further includes a shelf 126 pivotally attached along one edge thereof to a bottom edge of the backstop 124. The backstop 124 is pivotally attached to the seat back 102 such that a bottom edge of the backstop is configured to rotate between a stowed position within the recess 122 and a deployed position outside of the recess 122. The shelf 126 is pivotally attached to the backstop 124 such that the shelf 126 is configured to rotate between a stowed position against the backstop 124 and a deployed position apart from the backstop 124 in which the shelf 26 is oriented substantially horizontal. In some embodiments, a mechanical stop associated with the hinged connections of the backstop 124 and shelf 126 operates to limit rotation of the respective components. When fully deployed, the shelf 126 is positioned above and spaced apart from the underlying tray table 104.

Figure 3:
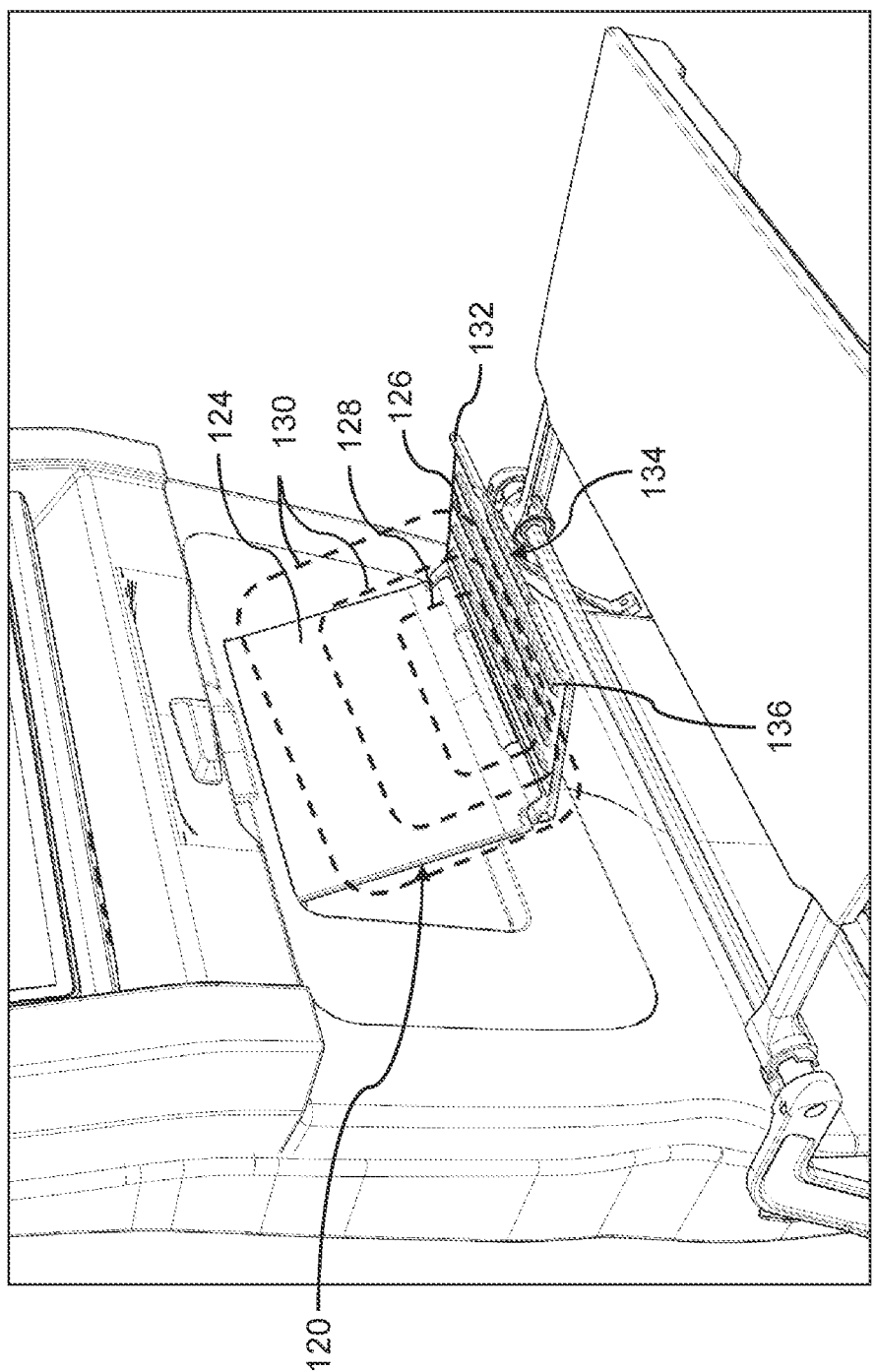
FIG. 3 is a detailed view of the passenger seat of FIG. 1, showing the PED holder in use holding different PEDs.

FIG. 3 illustrates the PED holder 120 in use holding various sized PEDs, for instance smartphones 128 and tablets 130 of various sizes. In use, the shelf 126 supports the PED from below and the PED leans against the backstop 124. In some embodiments, the shelf 126 includes a raised lip 132 formed along a free edge thereof (i.e., the forward edge) for preventing the supported bottom of the device from falling off the shelf 126, a handle 134 formed along a middle portion of the raised lip 132 for deploying the PED holder 120 and manipulating the shelf 126, and at least one transverse ridge 136 formed on the top surface of the shelf 126 for maintain stable angular positions of the supported device. In use, a particular transverse ridge 136 can be used to constrain the bottom of the PED, and the handle 134 can be used to grip the shelf 126.

Figure 4:
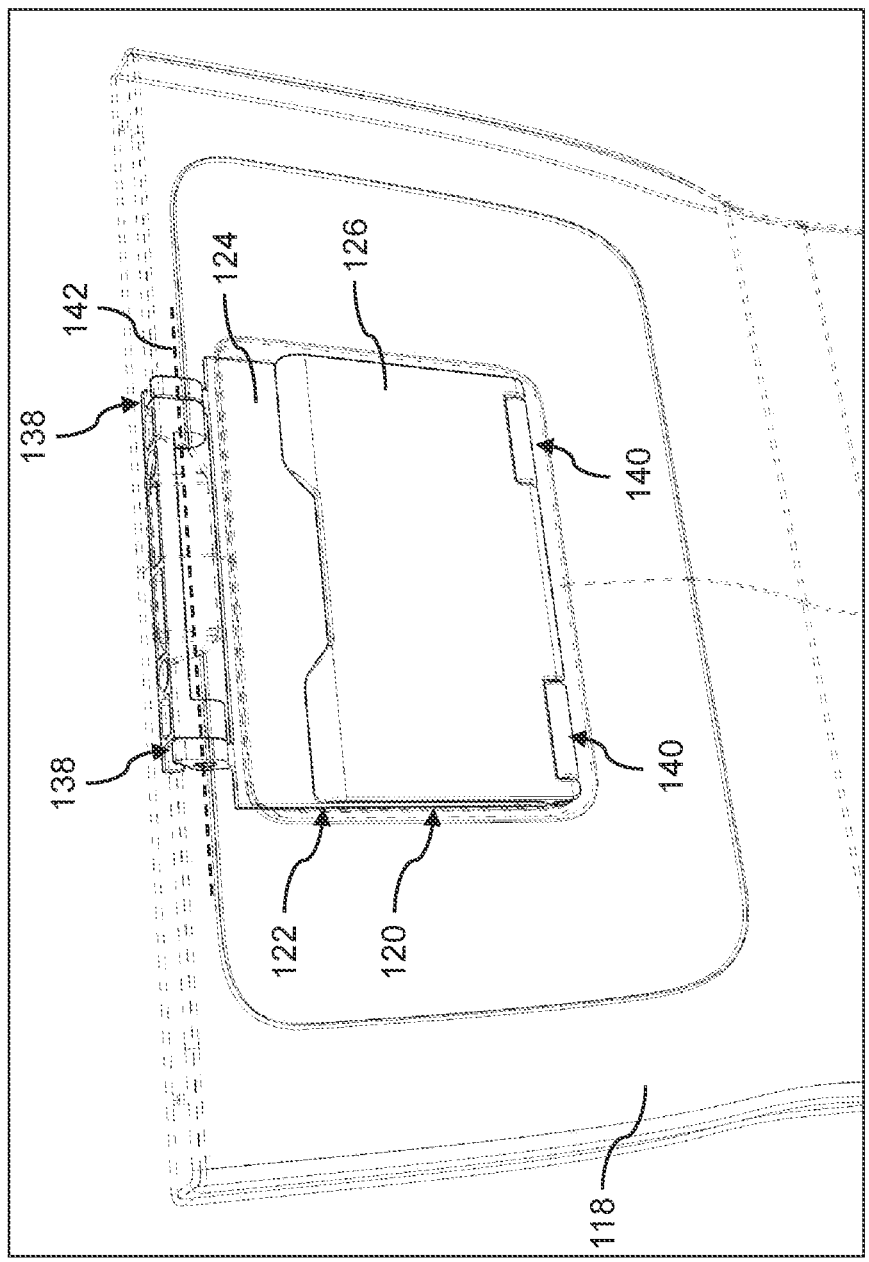
FIG. 4 is a perspective view of a PED holder assembly, according to an embodiment of the present disclosure, showing the PED holder in a stowed condition.

FIG. 4 illustrates an assembly including a shroud 118 and a PED holder 120 affixed to the shroud 118. In some embodiments, the shroud occupies a middle portion of a seat back and defines a recess for accommodating the PED holder 120. In some embodiments, the backstop 124 is pivotally attached to the seat back 102 or to the shroud 118 by at least one friction hinge 138, and the shelf 126 is pivotally attached to the backstop 124 by at least one friction hinge 140. In some embodiments, a portion of the at least one friction hinge 138 pivotally attaching the backstop 124 to the seat back 102 may be integrally formed with the backstop 124. In some embodiments, a portion of the at least one friction hinge 140 pivotally attaching the shelf 126 to the backstop 124 may be integrally formed with the shelf 126, and another portion of the at least one friction hinge 140 pivotally attaching the shelf 126 to the backstop 124 may be integrally formed with the backstop 124. The at least one friction hinge 138 pivotally attaching the backstop 124 to the shroud 118 defines an upper pivot point 142 located within the recess 122 or above the recess 122 and concealed from view behind a portion of the shroud 118.

Figure 5:
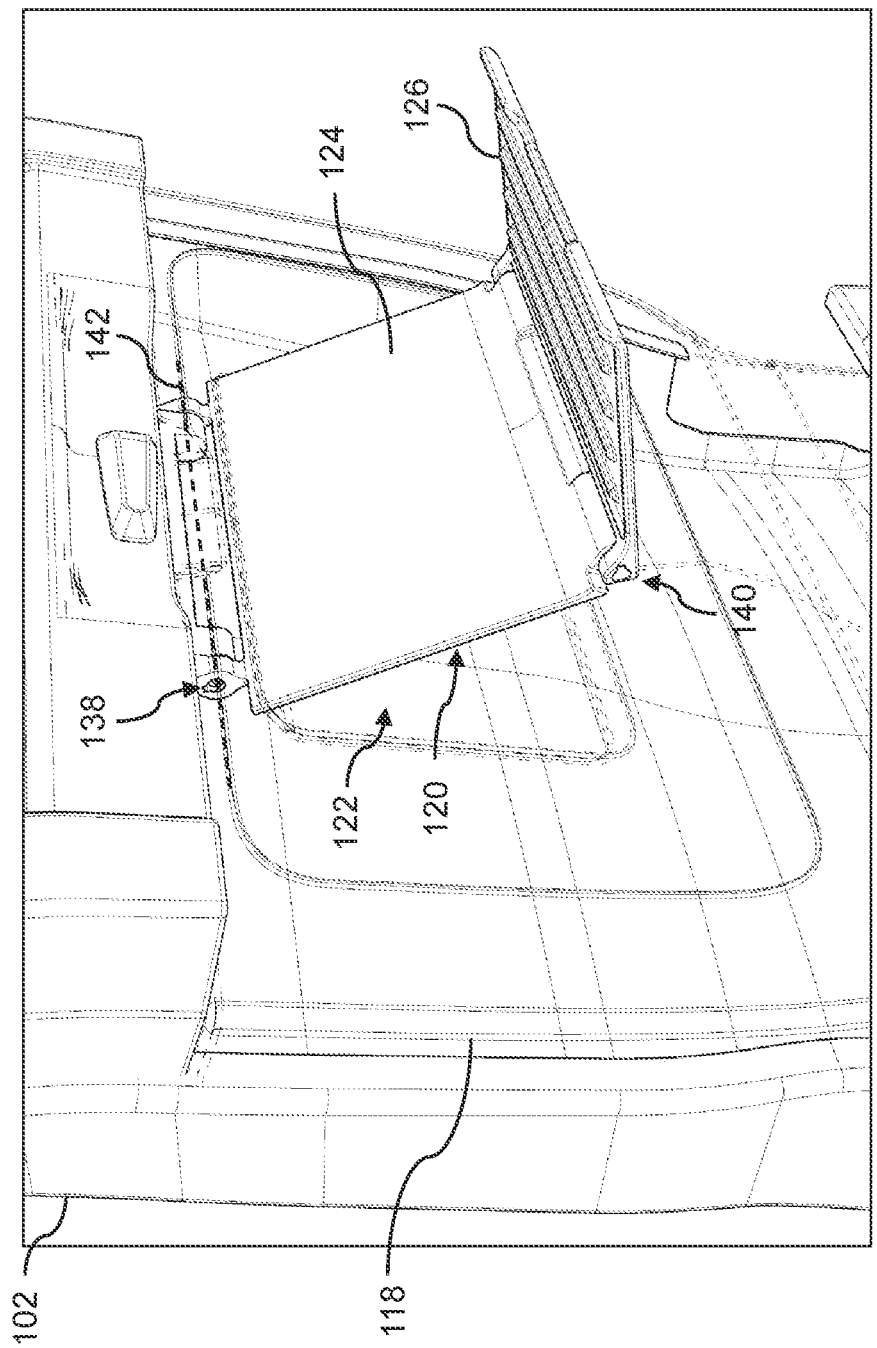
FIG. 5 is a perspective view of a passenger seat showing the assembly of FIG. 4 affixed to the passenger seat.

FIG. 5 illustrates the PED holder in a deployed condition in which the backstop 124 is rotated away from the recess 122 and the shelf 126 is rotated downward toward horizontal. In use, the friction hinges 138, 140 allow the backstop 124 to be positioned at a predetermined angle relative to the seat back 102 and the shelf 126 to be positioned at a predetermined angle, within their angular range, relative to the backstop 124. The friction hinges 138, 140 operate to resist unintentional movements and require a predetermined amount of force to overcome the hinge resistance.

FIG. 6 illustrates the relative positions of the backstop 124 and the shelf 126 in their fully deployed positions. When fully deployed, an angle 144 formed between the backstop 124 and a vertical axis 146 is no greater than about negative 45 degrees, and the shelf 126 is oriented substantially horizontal. By limiting the angle to such a maximum negative angle, the backstop 124 is positioned such that the backstop 124 does not prevent the tray table 104 from being rotated toward its stowed condition, and instead engagement of the rotating tray table 104 with the deployed backstop 124 and/or shelf 126 causes the shelf 126 to rotate toward the backstop 126 and the pair to rotate toward the recess with continued stowing motion of the tray table 104. Thus, the PED holder 120 is self-closing in that the closing motion can be coordinated with the stowing motion of the tray table 104. The PED holder 120 can also be closed manually while the tray table 104 remains deployed.

While the foregoing description provides embodiments of the invention by way of example only, it is envisioned that other embodiments may perform similar functions and/or achieve similar results. Any and all such equivalent embodiments and examples are within the scope of the present invention and are intended to be covered by the appended claims.

What is claimed:

1. A passenger seat, comprising:
   a seat back;
   a shroud positioned on a back of the seat back;
   a recess formed in the shroud;
   a tray table configured to stow against the shroud, deploy away from the shroud, and cover the recess when the tray table is fully stowed; and
   a portable electronic device holder (PED), comprising:
      a backstop pivotally attached along a top edge thereof to the seat back, the backstop configured to rotate between a stowed position in the recess and a deployed position outside of the recess; and
      a shelf pivotally attached along one edge thereof to a bottom edge of the backstop;
      wherein, when the backstop is fully deployed, an angle formed between the backstop and a vertical axis is no greater than about negative 45 degrees; and
      wherein, when the shelf is fully deployed, the shelf is oriented substantially horizontal;
   wherein, when the tray table, the backstop, and the shelf are each fully deployed, stowing motion of the tray table to cover the recess causes the tray table to contact the shelf, the shelf to rotate toward the backstop, and the backstop to rotate into the recess thereby stowing the PED in the recess.

2. The passenger seat according to claim 1, wherein:
   the backstop is pivotally attached to the seat back by at least one friction hinge; and
   the shelf is pivotally attached to the backstop by at least one friction hinge.

3. The passenger seat according to claim 2, wherein:
   a portion of the at least one friction hinge pivotally attaching the backstop to the seat back is integrally formed with the backstop;
   a portion of the at least one friction hinge pivotally attaching the shelf to the backstop is integrally formed with the shelf; and
   a portion of the at least one friction hinge pivotally attaching the shelf to the backstop is integrally formed with the backstop.

4. The passenger seat according to claim 1, wherein the at least one friction hinge pivotally attaching the backstop to the seat back defines an upper pivot point located within the recess, or above the recess concealed from view behind a portion of the shroud.

5. The passenger seat according to claim 1, wherein, when the tray table and the PED are fully deployed, the shelf is spaced apart above the tray table.

6. The passenger seat according to claim 1, wherein the shelf comprises:
a raised lip formed along a free edge of the shelf;
a handle formed along a middle portion of the raised lip; and
a plurality of transverse ridges formed along a top surface of the shelf.

7. The passenger seat according to claim 1, wherein the PED holder is not available for use when the tray table is fully stowed.

8. The passenger seat according to claim 1, further comprising a tray table latch positioned above the recess and a video monitor positioned above the tray table latch.

9. The passenger seat according to claim 1, wherein:
a length of the backstop substantially corresponds to a height of the recess; and
a length of the shelf is less than a length of the backstop.

10. A portable electronic device (PED) holder configured to be installed and stowed in a recess formed in a seat back, the recess located behind a tray table of the seat back when the tray table is in a stowed position, and the PED holder configured to be stowed in the recess by being contacted by the tray table during stowing action of the tray table against the recess, the PED holder comprising:
a backstop configured to be pivotally attached along a top edge thereof to the seat back, the backstop configured to rotate between a stowed position in the recess and a deployed position outside of the recess; and
a shelf pivotally attached along one edge thereof to a bottom edge of the backstop;
wherein, when the backstop is fully deployed, an angle formed between the backstop and a vertical axis is no greater than about negative 45 degrees; and
wherein, when the shelf is fully deployed, the shelf is oriented substantially horizontal.

11. The PED holder according to claim 10, wherein:
the backstop includes at least one friction hinge along a top edge thereof configured to attach to the seat back; and
the shelf is pivotally attached to the backstop by at least one friction hinge.

12. The PED holder according to claim 11, wherein:
a portion of the at least one friction hinge for pivotally attaching the backstop to the seat back is integrally formed with the backstop;
a portion of the at least one friction hinge pivotally attaching the shelf to the backstop is integrally formed with the shelf; and
a portion of the at least one friction hinge pivotally attaching the shelf to the backstop is integrally formed with the backstop.

13. The PED holder according to claim 10, wherein the at least one friction hinge for pivotally attaching the backstop to the seat back defines an upper pivot point to be located within the recess or above the recess and concealed from view behind a portion of the seat back.

14. The PED holder according to claim 10, wherein, when the PED holder is fully deployed, the shelf is configured to be spaced apart above the tray table.

15. The PED holder according to claim 10, wherein the shelf comprises:
a raised lip formed along a free edge of the shelf;
a handle formed along a middle portion of the raised lip; and
a plurality of transverse ridges formed along a top surface of the shelf.

16. The PED holder according to claim 10, wherein the PED holder is not available for use when the tray table is fully stowed.

17. An assembly configured to be installed on a back of a passenger seat, the passenger seat including a tray table configured to cover the assembly when the tray table is in a stowed position, the assembly comprising:
a shroud configured to be affixed to the passenger seat, the shroud defining a recess; and
a portable electronic device holder (PED), stowable in the recess, comprising:
a backstop pivotally attached along a top edge thereof to the shroud, the backstop configured to rotate between a stowed position in the recess and a deployed position outside of the recess; and
a shelf pivotally attached along one edge thereof to a bottom edge of the backstop;
wherein, when the backstop is fully deployed, an angle formed between the backstop and a vertical axis is no greater than about negative 45 degrees; and
wherein, when the shelf is fully deployed, the shelf is oriented substantially horizontal;
wherein, when the tray table, the backstop, and the shelf are each fully deployed, stowing motion of the tray table to cover the assembly causes the tray table to contact the shelf, the shelf to rotate toward the backstop, and the backstop to rotate into the recess thereby stowing the PED in the recess.

18. The assembly according to claim 17, wherein:
the backstop is pivotally attached to the shroud by at least one friction hinge; and
the shelf is pivotally attached to the backstop by at least one friction hinge.

19. The assembly according to claim 18, wherein:
a portion of the at least one friction hinge pivotally attaching the backstop to the shroud is integrally formed with the backstop;
a portion of the at least one friction hinge pivotally attaching the shelf to the backstop is integrally formed with the shelf; and
a portion of the at least one friction hinge pivotally attaching the shelf to the backstop is integrally formed with the backstop.

20. The assembly according to claim 17, wherein the shelf comprises:
a raised lip formed along a free edge of the shelf;
a handle formed along a middle portion of the raised lip; and
a plurality of transverse ridges formed along a top surface of the shelf.

* * * * *